US012807216B2

(12) United States Patent
Okada et al.

(10) Patent No.: US 12,807,216 B2
(45) Date of Patent: Nov. 24, 2026

(54) STEERING CONTROL DEVICE

(71) Applicants: JTEKT CORPORATION, Kariya (JP); TOYOTA JIDOSHA KABUSHIKI KAISHA, Toyota (JP)

(72) Inventors: Kotaro Okada, Okazaki (JP); Kazuki Itazuri, Toyota (JP)

(73) Assignees: JTEKT CORPORATION, Kariya (JP); TOYOTA JIDOSHA KABUSHIKI KAISHA, Toyota (JP)

(*) Notice: Subject to any disclaimer, the term of this patent is extended or adjusted under 35 U.S.C. 154(b) by 57 days.

(21) Appl. No.: 18/911,563

(22) Filed: Oct. 10, 2024

(65) Prior Publication Data

US 2025/0121877 A1 Apr. 17, 2025

(30) Foreign Application Priority Data

Oct. 17, 2023 (JP) ................................ 2023-178759

(51) Int. Cl.
*B62D 5/00* (2006.01)
*B62D 5/04* (2006.01)
*B62D 6/00* (2006.01)

(52) U.S. Cl.
CPC ........... *B62D 5/0463* (2013.01); *B62D 6/003* (2013.01)

(58) Field of Classification Search
CPC .... B62D 5/0463; B62D 5/0481; B62D 5/046; B62D 6/003; B62D 6/002; B62D 15/025; B62D 15/024
See application file for complete search history.

(56) References Cited

U.S. PATENT DOCUMENTS

| | | | | |
|---|---|---|---|---|
| 5,236,335 A * | 8/1993 | Takeuchi | B62D 5/001 | 180/404 |
| 5,267,160 A * | 11/1993 | Ito | B62D 6/02 | 701/42 |
| 5,606,502 A * | 2/1997 | Adachi | B62D 7/159 | 180/408 |

(Continued)

FOREIGN PATENT DOCUMENTS

| | | |
|---|---|---|
| JP | 2022-068056 A | 5/2022 |
| WO | 2013162447 A1 | 10/2013 |

OTHER PUBLICATIONS

Mar. 13, 2025 Extended European Search Report issued in European Patent Application No. 24205922.8.

*Primary Examiner* — Logan M Kraft
*Assistant Examiner* — Sherman D Manley
(74) *Attorney, Agent, or Firm* — Oliff PLC

(57) ABSTRACT

A software processing device of a steering control device is configured to execute a sampling process, a turning angle calculation process, and a control constant learning process. The sampling process is a process of sampling a steering angle and a yaw rate in synchronization. The turning angle calculation process is a process of calculating a turning angle of the turning wheel, using the yaw rate and a vehicle velocity as inputs. The control constant learning process is a process of learning a control constant based on a plurality of combinations each of which is constituted by the steering angle sampled by the sampling process and the turning angle corresponding to the steering angle. The control constant is a constant that indicates a rotational displacement of the turning wheel with respect to a rotational displacement of the steering shaft.

12 Claims, 10 Drawing Sheets

(56) References Cited

U.S. PATENT DOCUMENTS

| | | | | |
|---|---|---|---|---|
| 6,092,619 | A * | 7/2000 | Nishikawa | B62D 15/025 180/204 |
| 6,239,568 | B1 * | 5/2001 | Sugitani | B62D 6/00 701/72 |
| 6,405,113 | B1 * | 6/2002 | Yamawaki | B62D 6/04 701/30.6 |
| 6,895,318 | B1 * | 5/2005 | Barton | B60T 8/1755 701/41 |
| 7,168,520 | B2 * | 1/2007 | Weeber | B62D 5/008 180/443 |
| 7,548,807 | B2 * | 6/2009 | Bohm | B62D 6/002 180/443 |
| 7,885,742 | B2 * | 2/2011 | Yamazaki | B62D 6/02 701/41 |
| 7,931,113 | B2 * | 4/2011 | Matsuno | B62D 6/003 180/443 |
| 8,234,044 | B2 * | 7/2012 | Matsuno | B62D 5/008 180/443 |
| 8,515,622 | B2 * | 8/2013 | Shah | B62D 6/007 701/42 |
| 8,544,592 | B2 * | 10/2013 | Goutsu | B62D 6/002 180/402 |
| 10,065,675 | B2 * | 9/2018 | Codonesu | B62D 6/002 |
| 10,829,153 | B1 * | 11/2020 | Taniguchi | B62D 15/021 |
| 2003/0150666 | A1 * | 8/2003 | Ogawa | B62D 5/008 180/443 |
| 2005/0060074 | A1 * | 3/2005 | Sakai | B62D 6/002 701/41 |
| 2006/0006020 | A1 * | 1/2006 | Ono | B62D 5/0472 180/446 |
| 2007/0039775 | A1 * | 2/2007 | Matsuno | B62D 5/008 180/446 |
| 2009/0026003 | A1 * | 1/2009 | Kato | B62D 5/008 180/446 |
| 2010/0250068 | A1 * | 9/2010 | Yamazaki | B62D 6/02 701/41 |
| 2017/0151978 | A1 * | 6/2017 | Oya | B62D 5/005 |
| 2018/0043928 | A1 * | 2/2018 | Fujita | H02P 29/028 |
| 2020/0130729 | A1 * | 4/2020 | Lee | B62D 6/00 |
| 2021/0122413 | A1 * | 4/2021 | Yamaguchi | B62D 5/0469 |
| 2022/0135117 | A1 * | 5/2022 | Tsubaki | B62D 5/046 180/402 |
| 2023/0034107 | A1 * | 2/2023 | Son | B62D 5/0457 |
| 2023/0044665 | A1 * | 2/2023 | Watanabe | B62D 5/006 |
| 2025/0121876 | A1 * | 4/2025 | Okada | B62D 5/0463 |
| 2025/0382004 | A1 * | 12/2025 | Pásztor | B62D 5/046 |

* cited by examiner

STEERING CONTROL DEVICE

CROSS-REFERENCE TO RELATED APPLICATION

This application claims priority to Japanese Patent Application No. 2023-178759 filed on Oct. 17, 2023. The disclosure of the above-identified application, including the specification, drawings, and claims, is incorporated by reference herein in its entirety.

BACKGROUND

1. Technical Field

The present disclosure relates to a steering control device.

2. Description of Related Art

For example, Japanese Unexamined Patent Application Publication No. 2022-68056 describes a device that learns a play amount that is the maximum of an amount in which the turning angle of a turning wheel does not change even when the steering angle changes. The device rotates an electric power steering motor to right and left, when a key switch is turned on. Then, the device detects steering angles at which the turning wheel starts to turn, based on the increase in the electric current that flows through the motor. Then, the device assigns the difference between a pair of detected steering angles, to the play amount.

SUMMARY

The above play amount changes depending on the vehicle velocity. However, the above device cannot calculate the play amount when the vehicle velocity is higher than zero.

Configuration 1. A steering control device according to an aspect of the present disclosure includes a software processing device. The software processing device controls a steering device. The steering device includes a steering shaft, and a turning wheel of a vehicle, the turning wheel turning with rotation of the steering shaft. The software processing device is configured to execute a sampling process, a turning angle calculation process, and a control constant learning process. The sampling process is a process of sampling a steering angle and a yaw rate in synchronization. The steering angle is a rotation angle of the steering shaft. The turning angle calculation process is a process of calculating a turning angle of the turning wheel, using the yaw rate and a vehicle velocity as inputs. The control constant learning process is a process of learning a control constant based on a plurality of combinations each of which is constituted by the steering angle sampled by the sampling process and the turning angle corresponding to the steering angle. The control constant is a constant that indicates a rotational displacement of the turning wheel with respect to a rotational displacement of the steering shaft.

In the above configuration 1, the turning angle is calculated depending on the yaw rate and the vehicle velocity. Thereby, it is possible to acquire the relation between the turning angle and steering angle when the vehicle velocity is higher than zero, and therefore, it is possible to learn the value of the control constant.

Configuration 2. In the steering control device according to the above configuration 1, the control constant may include a stiffness coefficient that is the ratio of the turning angle to the steering angle. The control constant learning process may include a process of learning the slope of a straight line as the stiffness coefficient, the slope of the straight line being decided from the plurality of combinations each of which is constituted by the steering angle and the turning angle corresponding to the steering angle.

There is a proportional relation between the steering angle and the turning angle. In the above configuration 2, it is possible to learn the stiffness coefficient that indicates the proportional relation.

Configuration 3. In the steering control device according to the above configuration 1 or configuration 2, the control constant may include a dead band width. The dead band width may be a rotation amount by which the steering shaft rotates after a rotation direction of the steering shaft switches from one of a right-turn direction and a left-turn direction to the other of the right-turn direction and the left-turn direction and before the turning wheel turns. The control constant learning process may include a right-turn straight line calculation process, a left-turn straight line calculation process, and a dead band width calculation process. The right-turn straight line calculation process may be a process of calculating a right-turn straight line from a first plurality of combinations included in the plurality of combinations each of which is constituted by the sampled steering angle and the turning angle corresponding to the steering angle and being combinations when the rotation direction is the right-turn direction. The left-turn straight line calculation process may be a process of calculating a left-turn straight line from a second plurality of combinations included in the plurality of combinations each of which is constituted by the sampled steering angle and the turning angle corresponding to the steering angle and being combinations when the rotation direction is the left-turn direction. The dead band width calculation process may be a process of calculating a difference in intercept between the right-turn straight line and the left-turn straight line, as the dead band width.

In the above configuration 3, it is possible to calculate the dead band width by calculating the right-turn straight line and the left-turn straight line.

Configuration 4. In the steering control device according to any one of the above configuration 1 to configuration 3, the control constant learning process may be a process of calculating the control constant for each of different vehicle velocities from each other, based on a plurality of combinations each of which is constituted by the steering angle sampled by the sampling process for each of the different vehicle velocities from each other and the turning angle corresponding to the steering angle.

The control constant tends to change depending on the vehicle velocity. Hence, in the above configuration 4, the control constant is learned for each vehicle velocity. Thereby, it is possible to obtain an appropriate control constant depending on the vehicle velocity.

Configuration 5. In the steering control device according to any one of the above configuration 1 to configuration 4, the sampling process may be executed when the magnitude of the steering angle is equal to or more than a learning minimum.

In the case where the magnitude of the steering angle is excessively small, the yaw rate becomes excessively small, and therefore, the accuracy of the estimation of the turning angle with use of the yaw rate decreases. In response, in the above configuration 5, the control constant is learned using the yaw rate sampled when the magnitude of the steering angle is equal to or more than the learning minimum. Thereby, it is possible to enhance the learning accuracy for the control constant, compared to the case of the use of the yaw rate sampled when the magnitude of the steering angle is less than the learning minimum.

Configuration 6. In the steering control device according to any one of the above configuration 1 to configuration 5, the sampling process may be executed when the magnitude of the steering angle is equal to or less than a learning maximum. In the case where the magnitude of the steering angle is excessively large, the behavior of the vehicle easily becomes unstable, and therefore, the accuracy of the estimation of the turning angle with use of the yaw rate decreases. In response, in the above configuration 6, the control constant is learned using the yaw rate sampled when the magnitude of the steering angle is equal to or less than the learning maximum. Thereby, it is possible to enhance the learning accuracy for the control constant, compared to the case of the use of the yaw rate sampled when the magnitude of the steering angle is larger than the learning maximum.

Configuration 7. In the steering control device according to any one of the above configuration 1 to configuration 6, the sampling process may be executed when the magnitude of the change velocity of the steering angle is equal to or less than a prescribed velocity. When the steering angle changes, the yaw rate changes in response to the change in the steering angle. Therefore, in the case where the yaw rate is sampled when the change in the steering angle is large, the yaw rate is not stable, and therefore, the accuracy of the estimation of the turning angle with use of the yaw rate decreases. In response, in the above configuration 7, the control constant is learned using the yaw rate sampled when the magnitude of the change velocity of the steering angle is equal to or less than the prescribed velocity. Thereby, it is possible to enhance the learning accuracy for the control constant, compared to the case of the use of the yaw rate sampled when the magnitude of the change velocity of the steering angle is larger than the prescribed velocity.

Configuration 8. In the steering control device according to any one of the above configuration 1 to configuration 7, the sampling process may be executed when the combination of the steering angle and the turning angle is not in a dead band region. The dead band region may be a region where the turning angle does not change in response to change in the steering angle.

In the case where the yaw rate is sampled when the combination of the steering angle and the turning angle is in the dead band region, the relation between the turning angle known from the yaw rate and the steering angle is influenced by the dead band region. Meanwhile, the dead band region is not a region that is unambiguously decided depending on the steering angle and the turning angle, and is a region that changes depending on the history of the steering angle. Therefore, the relation between the turning angle and the steering angle that is influenced by the dead band region is a relation specific to a situation when the sampling is performed. In response, in the above configuration 8, the yaw rate sampled when the combination of the steering angle and the turning angle is not in the dead band region is used, and thereby, it is possible to learn a control constant that expresses a general relation unrelated to the history of every driving.

Configuration 9. In the steering control device according to any one of the above configuration 1 to configuration 8, the sampling process may be executed when the magnitude of the change velocity of the steering angle during a latest predetermined period is equal to or less than a threshold.

In the case where the change in the steering angle during the predetermined period immediately before the sampling is large, there is fear that the behavior of the vehicle at the time of the sampling is not stable. That is, there is fear that the behavior of the vehicle at the time of the sampling is influenced by the change in the steering angle during the predetermined period. In that case, the accuracy of the turning angle that is calculated from the sampled yaw rate decreases. In response, in the above configuration 9, the sampling is executed in the case where the magnitude of the change velocity of the steering angle during the latest predetermined period is equal to or less than the threshold, and thereby, it is possible to enhance the accuracy of the estimation of the turning angle.

Configuration 10. In the steering control device according to any one of the above configuration 1 to configuration 9, the sampling process may be executed in each of a first state, a second state, a third state, and a fourth state. The first state may be a state where the steering angle when the steering angle changes in a right-turn direction is in a right-turn region. The second state may be a state where the steering angle when the steering angle changes in the right-turn direction is in a left-turn region. The third state may be a state where the steering angle when the steering angle changes in a left-turn direction is in the right-turn region. The fourth state may be a state where the steering angle when the steering angle changes in the left-turn direction is in the left-turn region.

In the above configuration 10, the yaw rate is sampled in each of the first state, the second state, the third state, and the fourth state, and thereby, it is possible to sample the yaw rate depending on various steering situations. Therefore, it is easy to learn the control constant depending on various steering situations.

Configuration 11. In the steering control device according to any one of the above configuration 2 to configuration 10 (except items that do not depend on the above configuration 2), the software processing device may be configured to execute a turning angle estimation process. The turning angle estimation process is a process of calculating an estimated value of the turning angle, using a detected value of the steering angle and the stiffness coefficient learned by the control constant learning process.

In the above configuration 11, the estimated value is calculated using the stiffness coefficient learned by the control constant learning process, and therefore, it is possible to use a more appropriate stiffness coefficient for the steering device, compared to the case of the use a default stiffness coefficient. Accordingly, it is possible to enhance the accuracy of the estimated value.

Configuration 12. In the steering control device according to the above configuration 11, the steering device may include a motor that rotates the steering shaft. The software processing device may be configured to execute a turning process. The turning process may be a process of manipulating the torque of the motor depending on a manipulated variable for a feedback control in which the estimated value of the turning angle is a controlled variable and a target value of the turning angle is a target value of the controlled variable.

In the above configuration 12, by using the estimated value, it is possible to execute the feedback control in which the controlled variable is the turning angle, without a sensor that detect the turning angle.

Configuration 13. In the steering control device according to any one of the above configuration 3 to configuration 12 (except items that do not depend on the above configuration 3), the steering device may include a motor that rotates the steering shaft. The software processing device may be configured to execute a turning process. The turning process may be a process of manipulating the torque of the motor using a dead band amount as an input, the dead band amount being calculated depending on the dead band width learned by the control constant learning process. The dead band amount is a maximal amount in which the turning angle does not change in response to change in the steering angle in a steering direction.

In the above configuration 13, the input for the process of manipulating the torque of the motor is the dead band amount that is calculated depending on the dead band width learned by the control constant learning process. Therefore, it is possible to use an accurate dead band width, compared to the case of the use of a default dead band width. Accordingly, in the above configuration 13, it is possible to manipulate the torque of the motor depending on an accurate dead band amount.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment of the present disclosure will be described below with reference to the drawings.

Premise Configuration

Figure 1:
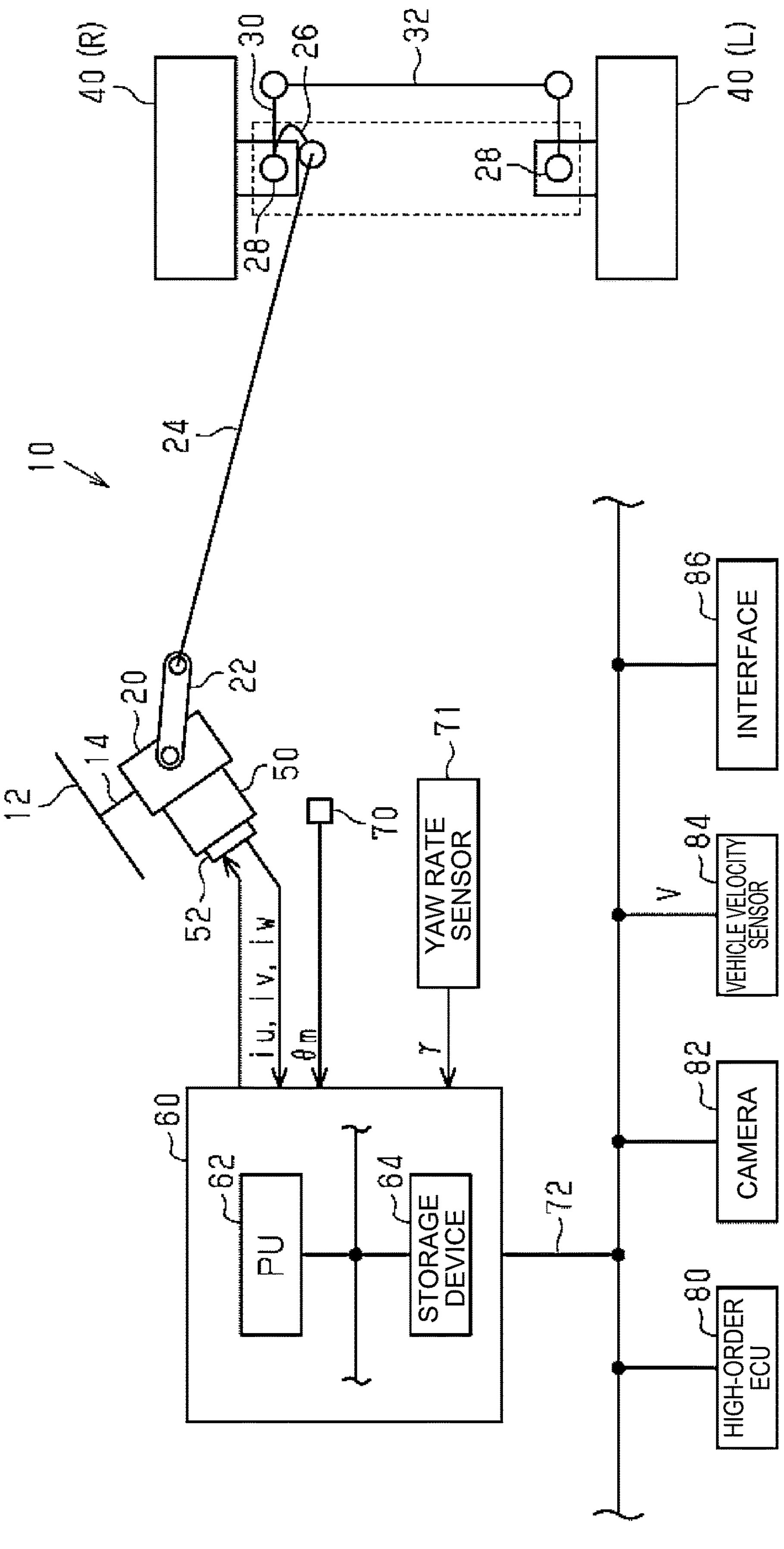
FIG. 1 is a diagram showing the configuration of a steering system according to an embodiment.

A steering device 10 shown in FIG. 1 includes a steering wheel 12. A steering shaft 14 is coupled to the steering wheel 12. An end portion of the steering shaft 14 on the opposite side of the steering wheel 12 is coupled to a steering gearbox 20. A sector shaft of the steering gearbox 20 is coupled to one end portion of the pitman arm 22. The other end portion of the pitman arm 22 is coupled to one end portion of a drag link 24. The other end portion of the drag link 24 is coupled to one end portion of a knuckle arm 26. The other end portion of the knuckle arm 26 is coupled to a kingpin shaft 28 of a right turning wheel 40(R). The kingpin shaft 28 of the right turning wheel 40(R) and a kingpin shaft 28 of a left turning wheel 40(L) are coupled by a tie rod arm 30 and a tie rod 32.

The rotation power of the motor 50 is transmitted to the steering shaft 14. As an example, the motor 50 is a synchronous electric motor. The output voltage of an inverter 52 is applied to terminals of the motor 50.

The steering control device 60 includes a Processing Unit (PU) 62 and a storage device 64. The PU 62 is a software processing device such as a Central Processing Unit (CPU), a Graphics Processing Unit (GPU), and a Tensor Processing Unit (TPU). The storage device 64 may be a nonvolatile memory in which electric rewriting is impossible. Further, the storage device 64 may be a nonvolatile memory in which electric rewriting is possible, or a storage medium such as a disk medium. The PU 62 executes programs stored in the storage device 64, and thereby, the steering control device 60 executes processes for controlling a controlled object.

The controlled object of the steering control device 60 is the steering device 10. For the control of the controlled object, the steering control device 60 refers to a rotation angle Om of the motor 50 that is detected by a rotational angle sensor 70. Further, the steering control device 60 refers to a yaw rate y that is detected by a yaw rate sensor 71. Further, the steering control device 60 refers to electric currents iu, iv, iw that flow through the terminals of the motor 50. For example, the electric currents iu, iv, iw may be detected as voltage drop amounts at shunt resistors provided on legs of the inverter 52. The steering control device 60 refers to a vehicle velocity V that is detected by a vehicle velocity sensor 84, through a network 72.

The steering control device 60 can communicate with a high-order Electronic Control Unit (ECU) 80 through the network 72. The high-order ECU 80 executes a process of generating a command for intervening in the steering of the vehicle, independently from the instruction of the steering due to the operation of the steering wheel 12. In other words, the high-order ECU 80 executes an autonomous steering process. For executing the autonomous steering process, the high-order ECU 80 acquires image data about the periphery of the vehicle that is photographed by a camera 82. Further, the high-order ECU 80 knows, for example, an intention indication that is relevant to the execution of the autonomous steering process and that is input through an interface 86 by a driver.

Characteristic of Steering Device 10

The above-described steering device 10 includes a complex link mechanism, and therefore, a so-called play in which the turning wheel 40 does not rotate in response to the rotation of the steering shaft 14 is large.

Figure 2:
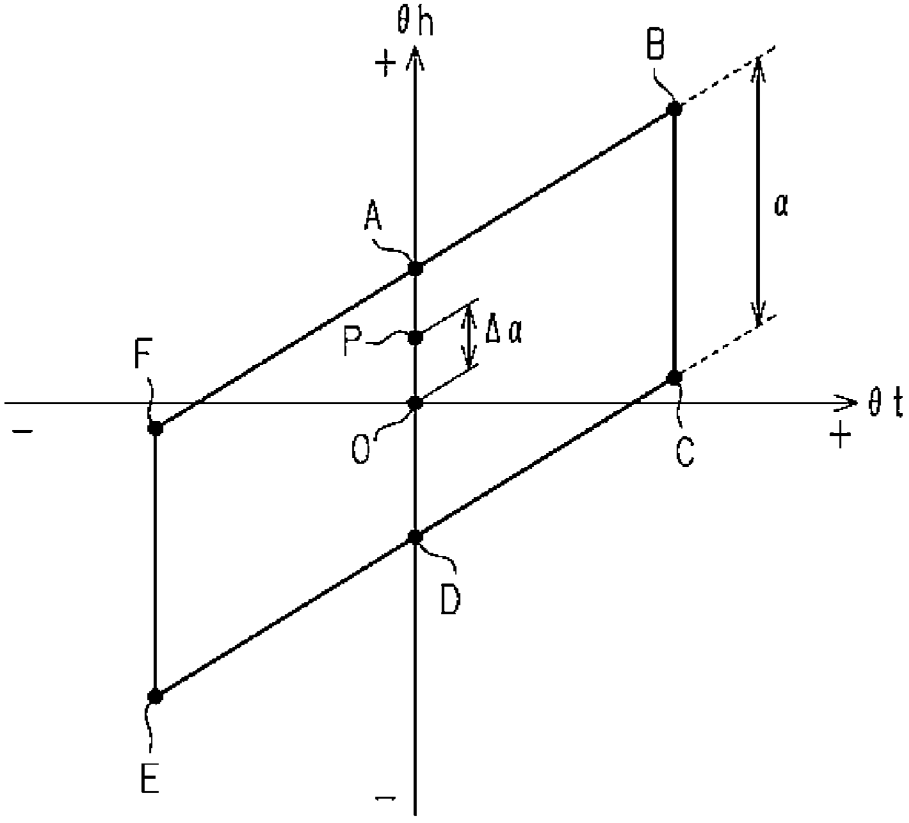
FIG. 2 is a diagram showing the relation between the steering angle and turning angle in the steering system shown in FIG. 1.

FIG. 2 shows the relation between a steering angle θh and a turning angle θt. The steering angle θh is the rotation angle of the steering shaft 14. On the other hand, the turning angle θt is the moving angle of a tire relevant to the turning wheel 40. Further, a neutral position O described in FIG. 2 is a point at which both of the steering angle θh and the turning angle θt are zero. This means that both of the steering angle θh and the turning angle θt indicate a straight movement direction. Hereinafter, it is assumed that a rotational angle in a right-turn direction is positive and a rotational angle in a left-turn direction is negative.

As shown in FIG. 2, even when the steering angle θh is changed from the neutral position O in the right-turn direction, the turning angle θt does not change until the steering angle θh reaches a point A. Then, when the steering angle θh becomes a further larger value than the point A, the turning angle θt increases.

Further, even when the steering angle θh is decreased at a point B, the turning angle θt does not change. In other words, even when a steering direction is switched to the left side at the point B, the turning angle θt does not change. The steering direction is the rotation direction of the steering shaft 14. Then, when the steering angle θh becomes a further small value beyond a point C, the turning angle θt decreases.

Then, at a point D, the turning angle θt becomes zero. A point E is a value that is obtained by further displacing the steering angle θh in the left-turn direction after the turning angle θt becomes zero. Even when the steering angle θh is increased at the point E, the turning angle θt does not change until the steering angle θh reaches a point F. When the steering angle θh becomes further large beyond the point F, the turning angle θt increases.

In this way, in the case where the combination of the steering angle θh and the turning angle θt is at the point B, the turning angle θt does not change even when the steering angle θh changes between the point B and the point C. Further, for example, in the case where the combination of the steering angle θh and the turning angle θt is at the point E, the turning angle θt does not change even when the steering angle θh changes between the point E and the point F. In this way, there is a dead band region that is a region where the turning angle θt does not change in response to the change in the steering angle θh, due to the play of the steering device 10. The dead band region is not a region that includes fixed values of the steering angle θh, and is a region that can change depending on the history of the change in the steering angle θh.

The displacement of the steering angle θh from the point B to the point C occurs in the switch-back from the right turn. Further, the displacement of the steering angle θh from the point E to the point F occurs in the switch-back from the left turn. A dead band width a shown in FIG. 2 is the length of the dead band region where the turning angle θt does not change in response to the change in the steering angle θh at the time of the switch-back from the right turn or the left turn.

Overview of Control of Steering Control Device

Figure 3:
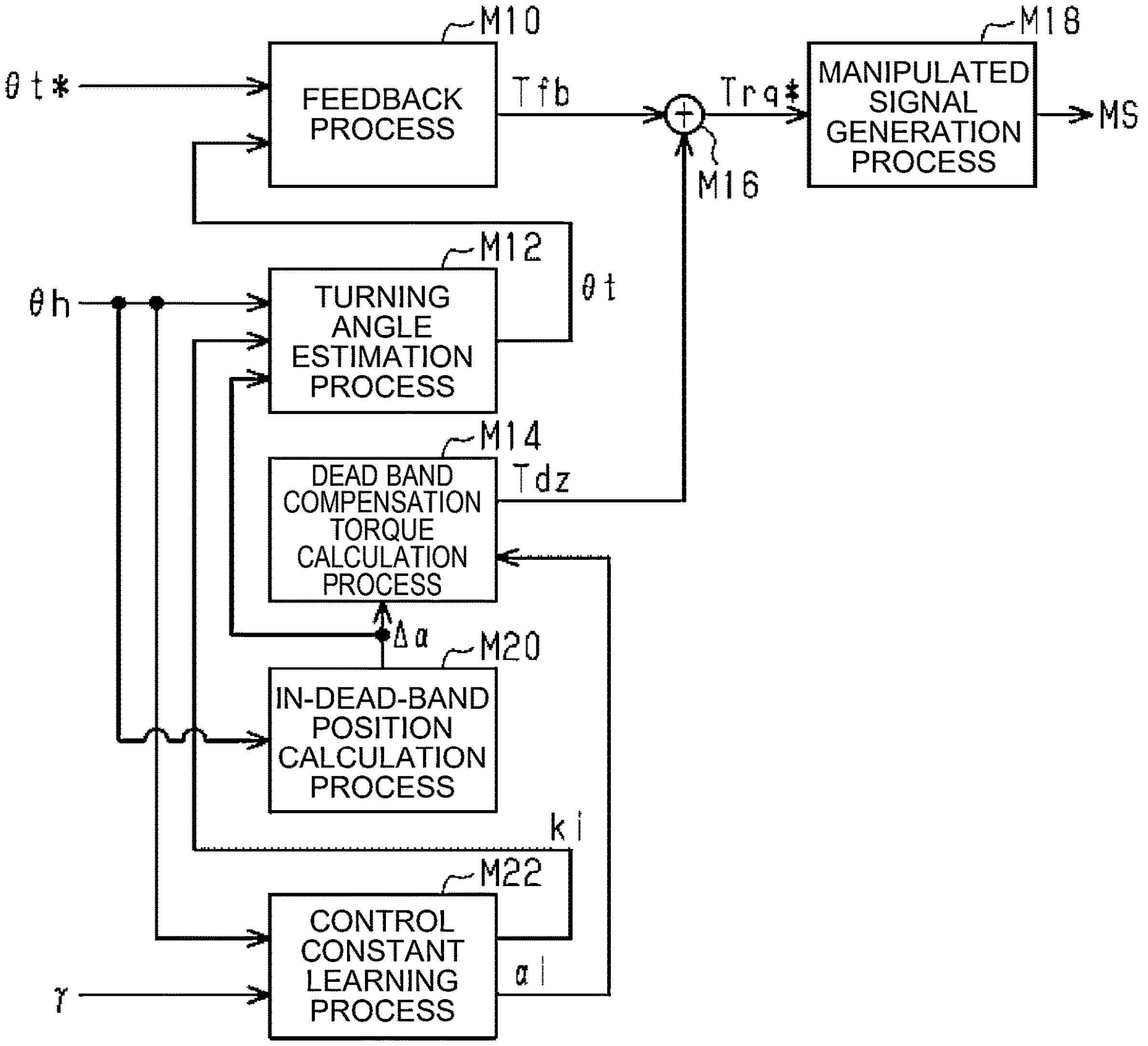
FIG. 3 is a block diagram showing processes that are executed by a steering control device shown in FIG. 1.

FIG. 3 shows some of processes that are executed by the steering control device 60. The process shown in FIG. 3 is realized when the PU 62 repeatedly executes programs stored in the storage device 64, for example, with a predetermined period.

A feedback process M10 is a process in which a target turning angle θt* and the turning angle θt are adopted as inputs and a feedback manipulated variable Tfb is adopted as an output. The feedback manipulated variable Tfb is a manipulated variable for a feedback control for which the turning angle θt is a controlled variable and the target turning angle θt* is a target value of the controlled variable. The target turning angle θt* is calculated by the high-order ECU 80. When an autonomous driving mode is selected by the operation of the interface 86, the high-order ECU 80 calculates a target locus along which the vehicle should travel, based on the image data about the periphery of the vehicle from the camera 82. Then, the high-order ECU 80 calculates the target turning angle θt* such that the actual traveling path of the vehicle gets close to the target locus.

A turning angle estimation process M12 is a process in which the steering angle θh is adopted as an input and the turning angle θt is adopted as an output. The turning angle θt is an estimated value. The steering angle θh is calculated by the PU 62, by the integration process of the rotation angle θm.

A dead band compensation torque calculation process M14 is a process in which a dead band compensation torque Tdz that is a manipulated variable for a feedforward control in the dead band region is adopted as an output. An addition process M16 is a process of assigning the sum of the feedback manipulated variable Tfb and the dead band compensation torque Tdz, to a torque command value Trq*. The torque command value Trq* is a command value of the torque of the motor 50. A manipulated signal generation process M18 is a process of generating a manipulated signal MS for such a control that the torque of the motor 50 gets close to the torque command value Trq* and outputting the manipulated signal MS to the inverter 52. The manipulated signal generation process M18 may be a process of causing the electric currents iu, iv, iw to get close to an electric current command value depending on the torque command value Trq*.

An in-dead-band position calculation process M20 is a process of calculating an in-dead-band position Aa that is a variable indicating a position in the dead band region shown in FIG. 2. FIG. 2 exemplifies the in-dead-band position Δα when the combination of the steering angle θh and the turning angle θt is at a point P.

A control constant learning process M22 is a process of learning a control constant that is a constant indicating the rotational displacement of the turning wheel 40 with respect to the rotational displacement of the steering shaft 14.

Control Constant Learning Process M22

Figure 4:
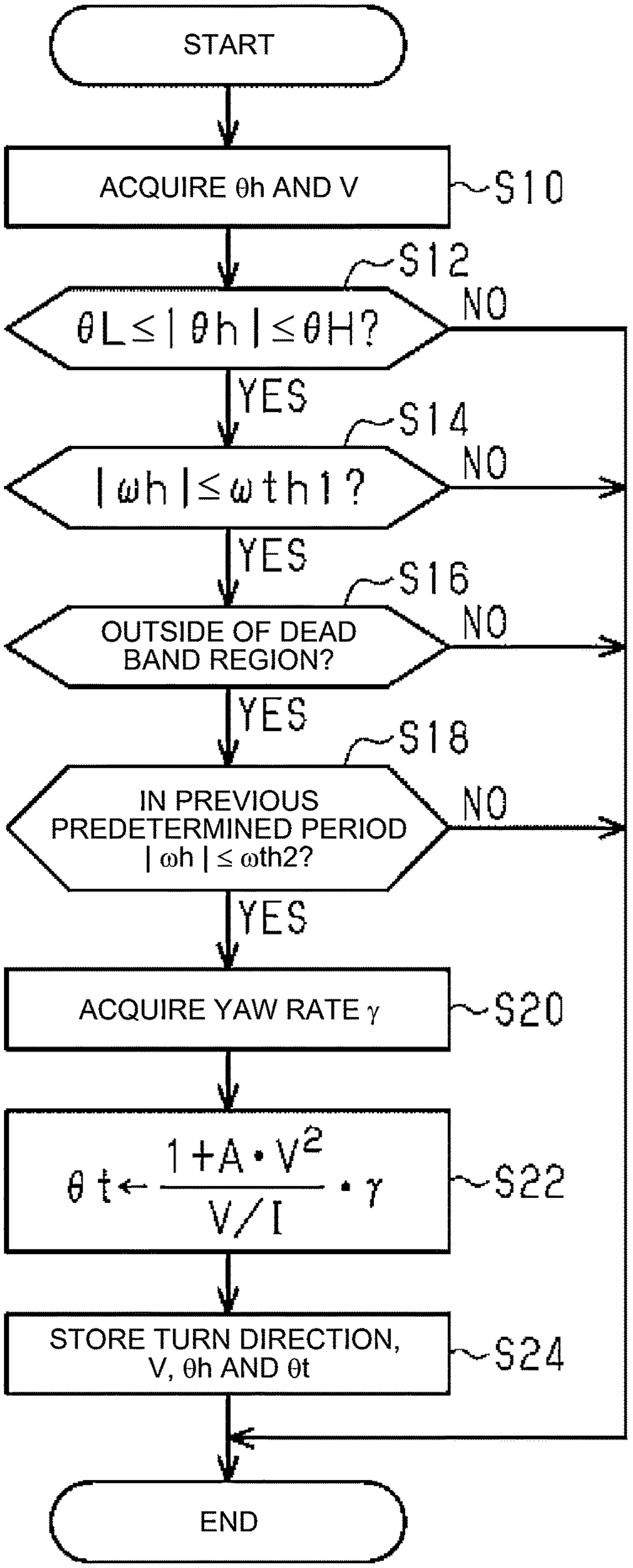
FIG. 4 is a flowchart showing a procedure of a process that is executed by the steering control device shown in FIG. 1.

FIG. 4 shows a procedure of a preprocess for the control constant learning process M22. A sequence of processes shown in FIG. 4 is realized when the PU 62 repeatedly executes programs stored in the storage device 64, for example, with a predetermined period. Hereinafter, the step number of a process is expressed as a numeral that is prepended with "S".

In the sequence of processes shown in FIG. 4, the PU 62, first, acquires the steering angle θh and the vehicle velocity V (S10). Next, the PU 62 determines whether the absolute value of the steering angle θh is equal to or more than a learning minimum θL and is equal to or less than a learning maximum θH (S12). The learning minimum θL is set based on a lower limit of the steering angle θh that allows a later-described learning process to be accurately performed. Further, the learning maximum θH is set based on an upper limit of the steering angle θh that allows the later-described learning process to be accurately performed. In the setting of the learning maximum θH, it is considered that the driving of the vehicle is not stable in the case where the steering angle θh is excessively large.

In the case where the PU 62 determines that the above absolute value is equal to or more than the learning minimum θL and is equal to or less than the learning maximum θH (S12: YES), the PU 62 determines whether a condition that the absolute value of a steering angular velocity ωh is equal to or less than a threshold ωth1 is satisfied (S14). The steering angular velocity ωh is the change velocity of the steering angle θh. The PU 62 calculates the steering angular velocity ωh, using time-series data about the steering angle θh. The condition that the absolute value of the steering angular velocity ωh is equal to or less than the threshold ωth1 is one of execution conditions for the later-described learning process. This condition is a condition indicating that the steering angle θh is stable.

In the case where the PU 62 determines that the absolute value of the steering angular velocity ωh is equal to or less than the threshold ωth1 (S14: YES), the PU 62 determines whether the combination of the steering angle θh and the turning angle θt is outside of the dead band region (S16). An input in this process is the in-dead-band position AΔα that is output by the in-dead-band position calculation process M20. In the case where the absolute value of the in-dead-band position Δα is less than "½" of a later-described dead band width αi, the PU 62 determines that the combination of the steering angle θh and the turning angle θt is in the dead band region.

In the case where the PU 62 determines that the combination of the steering angle θh and the turning angle θt is not in the dead band region (S16: YES), the PU 62 determines whether the following condition (A) is satisfied (S18).

Condition (A): a condition that the absolute value of the steering angular velocity ωh after a timing of a predetermined period before the present execution timing of the sequence of processes in FIG. 4 and before the current timing is equal to or less than a threshold ωth2.

In the case where the PU 62 determines that the condition (A) is satisfied (S18: YES), the PU 62 acquires the yaw rate yγ (S20). Next, the PU 62 assigns a value resulting from multiplying the yaw rate γ by "(1+A·V·V)/V/I", to the turning angle θt (S22). This process is a process in which the PU 62 estimates the turning angle θt based on the yaw rate γ. Here, a stability factor A and a wheelbase I are used.

Next, the PU 62 stores the turning angle θt estimated by the process of S22, in the storage device 64, in association with the turn direction, the vehicle velocity V, and the steering angle θh (S24). In the case where the PU 62 completes the process of S24 or in the case where the PU 62 makes the negative determination in the process of S12, S14, S16, or S18, the PU 62 ends the sequence of processes shown in FIG. 4 once.

Figure 5:
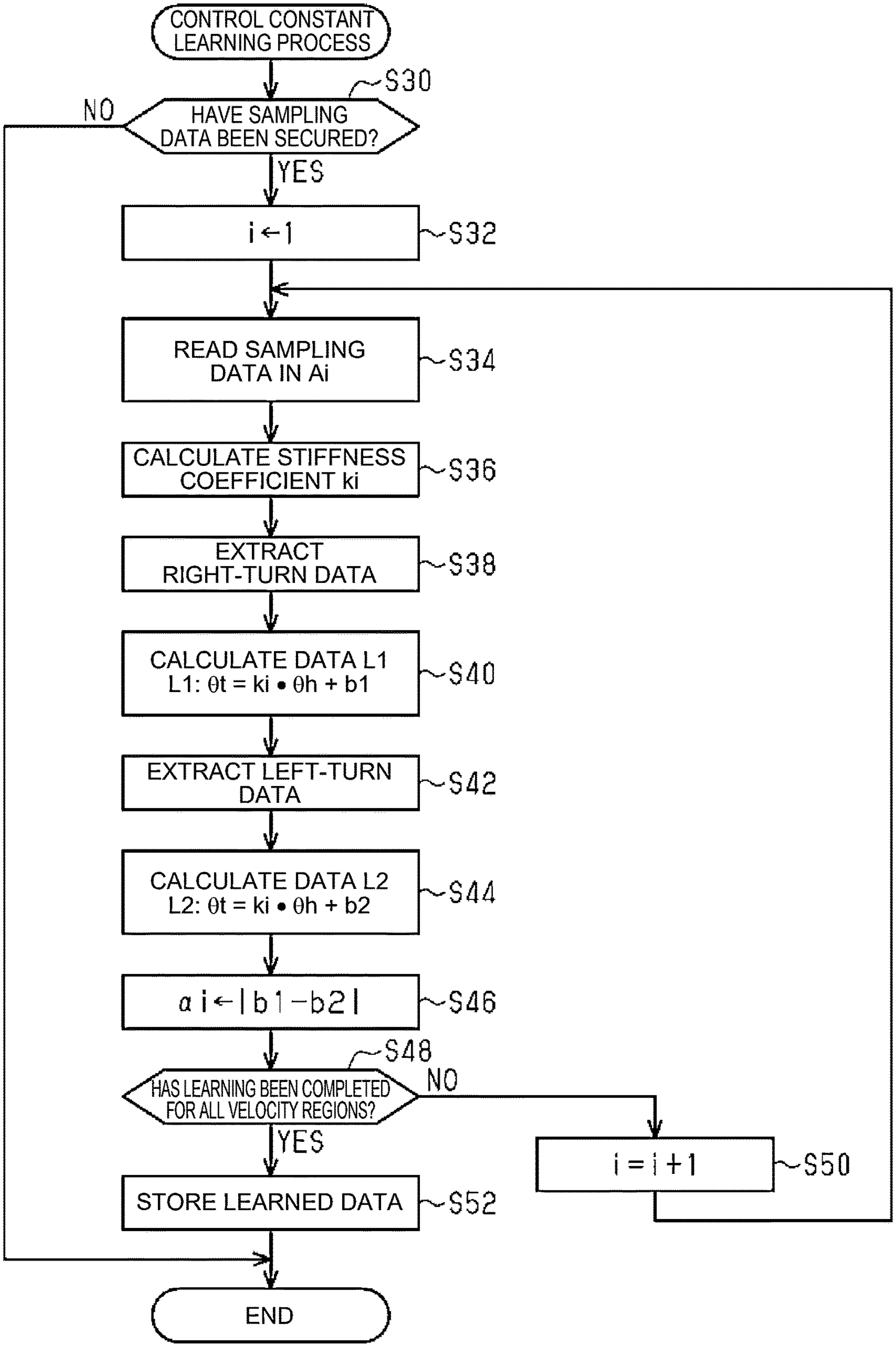
FIG. 5 is a flowchart showing a procedure of a process that is executed by the steering control device shown in FIG. 1.

FIG. 5 shows a procedure of the control constant learning process M22. A sequence of processes shown in FIG. 5 is realized when the PU 62 repeatedly executes programs stored in the storage device 64, for example, with a predetermined period.

In the sequence of processes shown in FIG. 5, the PU 62 determines whether the data stored in the storage device 64 by the process of S24 has been secured to such an amount that a learning condition is satisfied (S30). As an example, the learning condition is a condition that the number of values stored by the process of S24 in each of the following states 1 to 4 is a predetermined number. A plurality of predetermined numbers may be adopted.

State 1: a state where the steering angle θh is equal to or more than the learning minimum θL and is equal to or less than the learning maximum θH when the steering direction is the right-turn direction.

State 2: a state where the steering angle θh is equal to or more than "−θθH" and is equal to or less than "−θL" when the steering direction is the right-turn direction.

State 3: a state where the steering angle θh is equal to or more than the learning minimum θL and is equal to or less than the learning maximum θH when the steering direction is the left-turn direction.

State 4: a state where the steering angle θh is equal to or more than "−θH" and is equal to or less than "−θL" when the steering direction is the left-turn direction.

In the case where the PU 62 determines that the data has been secured to such an amount that the learning condition is satisfied (S30: YES), the PU 62 assigns "1" to a variable i that identifies the above data (S32). Next, the PU 62 reads data that is of the sampling data stored in the storage device 64 by the process of S24 and in which the vehicle velocity V is in a region Ai (S34). The region Ai shows one of regions A1, A2, . . . , depending on the variable i. The regions A1, A2, . . . are regions of the vehicle velocity V that are different from each other. For example, a region A3 is a region from 30 km/h to 40 km/h, and a region A4 is a region from 40 km/h to 50 km/h. Then, the PU 62 calculates a stiffness coefficient ki (S36). The stiffness coefficient is a coefficient that decides the ratio of the change amount of the turning angle θt to the change amount of the steering angle θh in the case where the combination of the steering angle θh and the turning angle θt is not in the dead band region.

Figure 6:
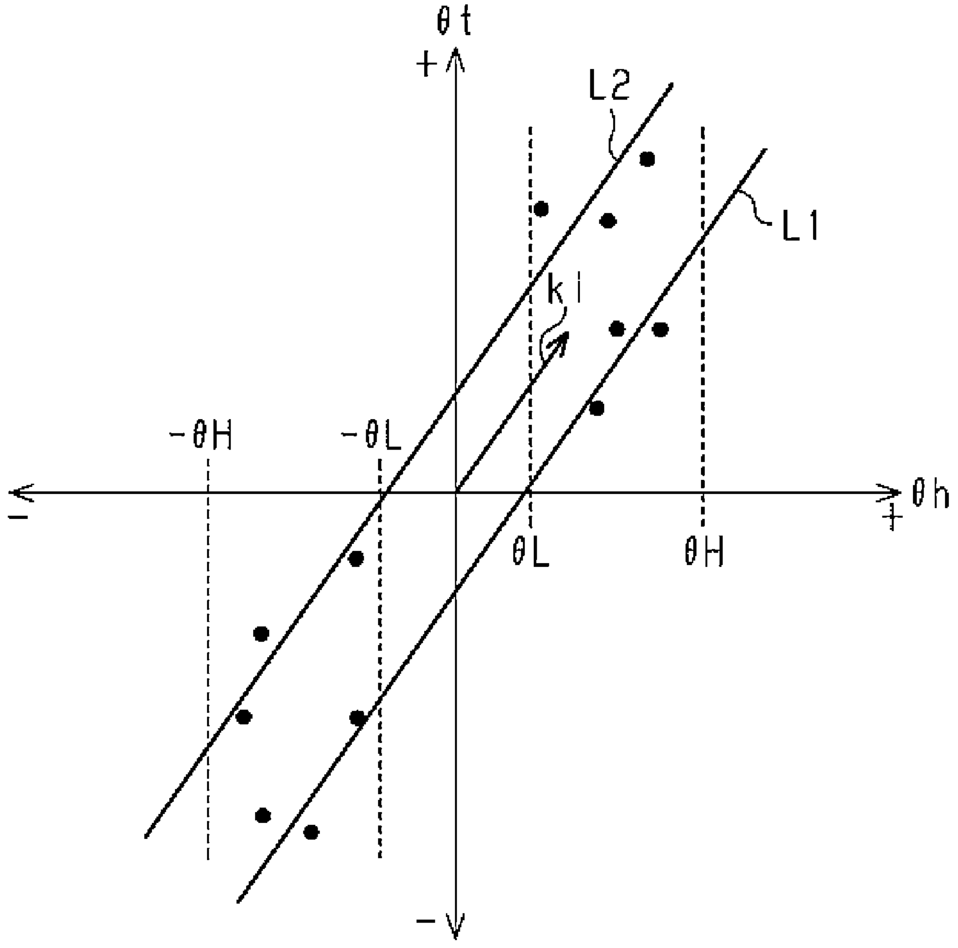
FIG. 6 is a diagram exemplifying a part of the process shown in FIG. 5.

Each of black circles shown in FIG. 6 indicates the combination of the steering angle θh and the turning angle θt that is stored by the process of S24. As an example, the PU 62 evaluates a straight line that minimizes the deviation from a sampling point indicating the combination of the steering angle θh and the turning angle θt, using the least squares method. Then, the PU 62 assigns the slope of the straight line to the stiffness coefficient ki. The stiffness coefficient ki is a learning value when the vehicle velocity V is a value in the region Ai.

Back to FIG. 5, the PU 62 extracts data that is of the data read by the process of S34 and in which the steering direction is the right-turn direction (S38). Then, the PU 62 calculates a right-turn straight line L1 shown in FIG. 6, based on the data extracted by the process of S38 (S40). The right-turn straight line L1 is a straight line in which the slope is the stiffness coefficient ki calculated by the process of S36 and that has an intercept b1. The process of S40 is a process of evaluating the intercept b1 at which the difference between the extracted data and the right-turn straight line L1 is minimized. The right-turn straight line L1 is an approximation expression for approximating the relation between the steering angle θh and the turning angle θt when the steering direction is the right-turn direction.

Next, the PU 62 extracts data that is of the data read by the process of S34 and in which the steering direction is the left-turn direction (S42). Then, the PU 62 calculates a left-turn straight line L2, based on the data extracted by the process of S42 (S44). The left-turn straight line L2 is a straight line in which the slope is the stiffness coefficient ki calculated by the process of S36 and that has an intercept b2. The process of S44 is a process of evaluating the intercept b2 at which the difference between the extracted data and the left-turn straight line L2 is minimized. The left-turn straight line L2 is an approximation expression for approximating the relation between the steering angle θh and the turning angle θt when the steering direction is the left-turn direction.

Next, the PU 62 assigns the absolute value of the difference between the intercept b1 and the intercept b2, to the dead band width αi (S46). The dead band width αi is a learning value when the vehicle V is a value in the region Ai. Then, the PU 62 determines whether the learning of stiffness coefficients k1, k2, . . . and dead band widths α1, α2, . . . has been completed for all regions A1, A2, . . . relevant to the vehicle velocity V (S48). In the case where the PU 62 determines that there is a region for which the learning has not been completed yet (S48: NO), the PU 62 increments the variable i (S50), and returns to the process of S34.

On the other hand, in the case where the PU 62 determines that the learning has been completed for all regions (S48:

YES), the PU 62 stores the learned data in a predetermined region of the storage device 64 (S52). In the case where the PU 62 completes the process of S52 or in the case where the PU 62 makes the negative determination in the process of S30, the PU 62 ends the sequence of processes shown in FIG. 5 once.

Incidentally, before the completion of the above learning, the PU 62 uses preset default values as the stiffness coefficient ki and the dead band width αi. The default values are previously stored in the storage device 64. Further, a region A0 in which the vehicle velocity V is zero and that is not the learning object in the process in FIG. 6 may be provided. In that case, the learning of a dead band width α0 in the region A0 may be separately performed using the well-known art.

Turning Angle Estimation Process

Figure 7:
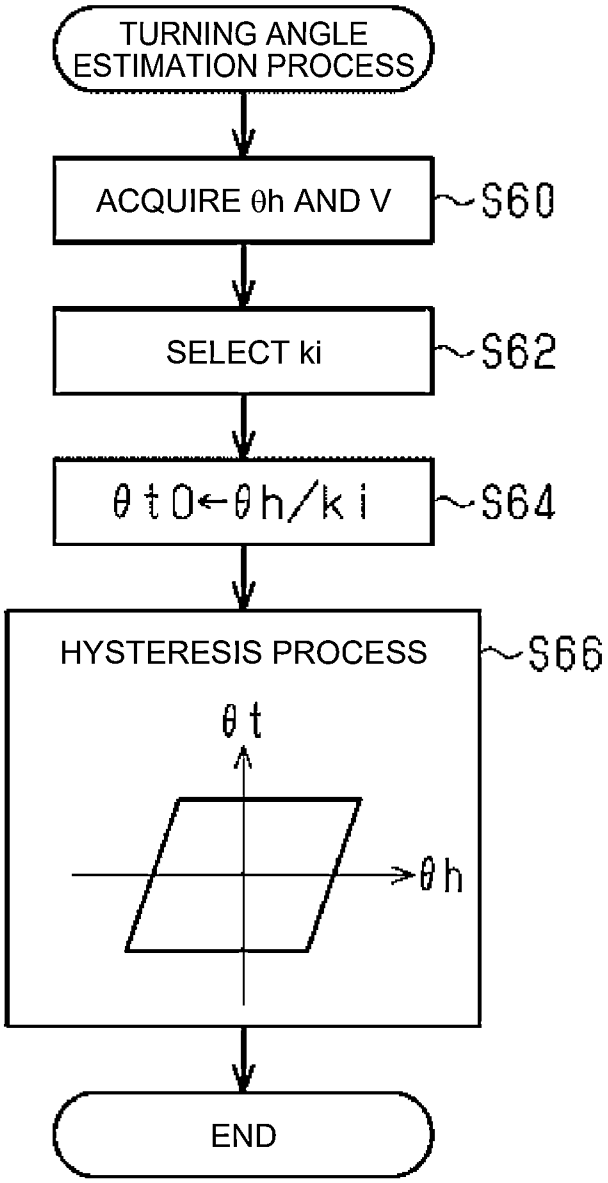
FIG. 7 is a flowchart showing a procedure of a process that is executed by the steering control device shown in FIG. 1.

FIG. 7 shows a procedure of the turning angle estimation process M12. Processes shown in FIG. 7 are realized when the PU 62 repeatedly executes programs stored in the storage device 64, for example, with a predetermined period.

In the sequence of processes shown in FIG. 7, first, the PU 62 acquires the steering angle θh and the vehicle velocity V (S60). Next, the PU 62 selects the stiffness coefficient ki based on the vehicle velocity V acquired by the process of S60 (S62). For example, in the case where the vehicle velocity V is a value in the region A2, the PU 62 selects the stiffness coefficient k2.

Next, the PU 62 assigns a value resulting from dividing the steering angle θh by the stiffness coefficient ki, to a turning angle θt0 (S64). Next, the PU 62 calculates the turning angle θt by correcting the turning angle θt0 when appropriate (S66). That is, in the case where the turning angle θt0 is in the dead band region, the PU 62 assigns the last value of the turning angle θt to the turning angle θt. On the other hand, in the case where the turning angle θt0 is not in the dead band region, the PU 62 assigns a value resulting from adding the difference between the current value of the turning angle θt0 and the last value of the turning angle θt to the last value of the turning angle θt, to the current value of the turning angle θt. Whether the turning angle θt0 is in the dead band region is determined based on whether the magnitude of the in-dead-band position Δα calculated by the in-dead-band position calculation process M20 is smaller than "½" of the dead band width αi. That is, in the process of S66, the in-dead-band position Δα is adopted as an input.

In the where the PU 62 completes the process of S66, the PU 62 ends the sequence of processes shown in FIG. 7 once.

In-Dead-Band Position Calculation Process M20

Figure 8:
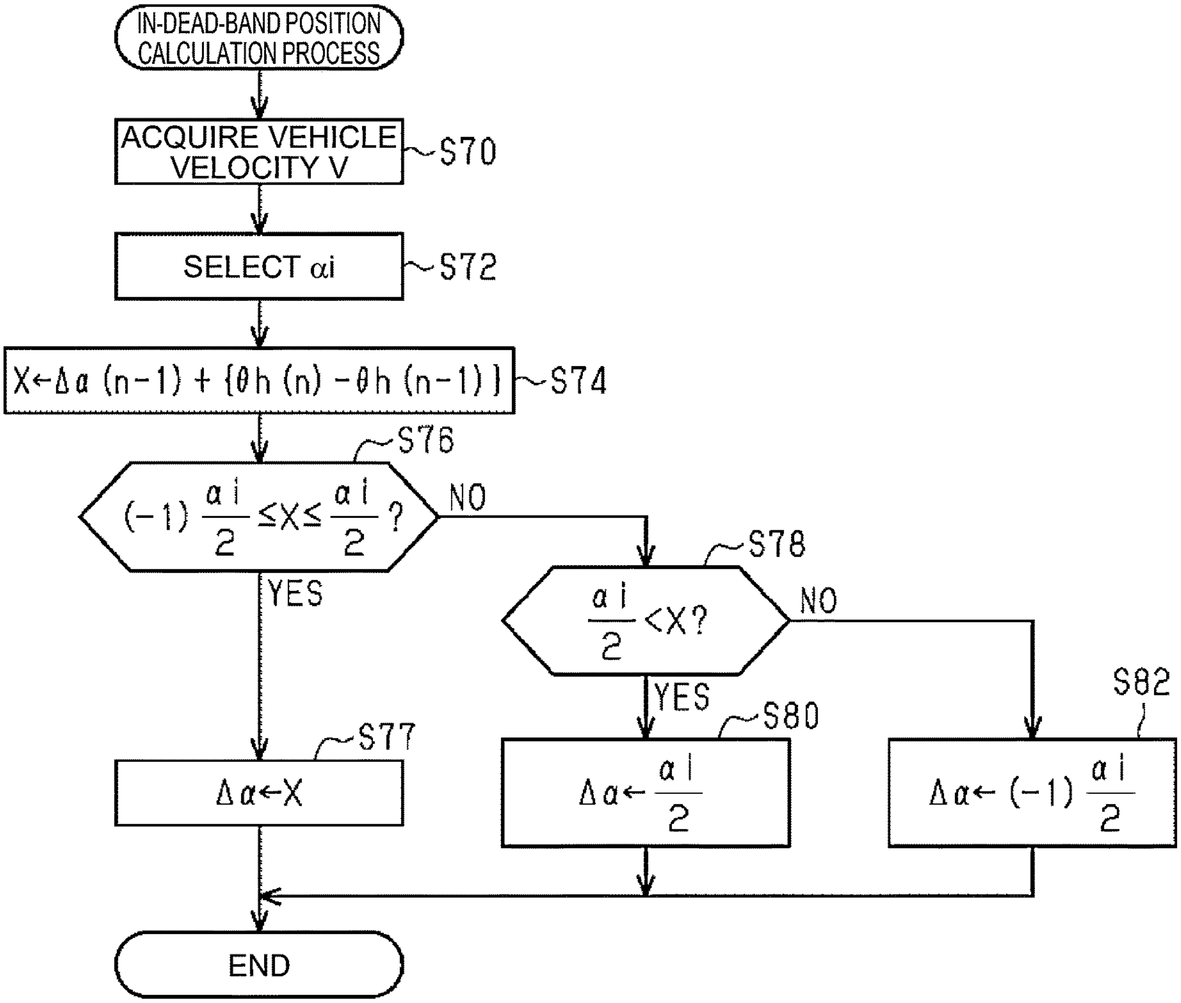
FIG. 8 is a flowchart showing a procedure of a process that is executed by the steering control device shown in FIG. 1.

FIG. 8 shows a procedure of the in-dead-band position calculation process M20. Processes shown in FIG. 8 are realized when the PU 62 repeatedly executes programs stored in the storage device 64, for example, with a predetermined period.

In the sequence of processes shown in FIG. 8, first, the PU 62 acquires the vehicle velocity V (S70). Next, the PU 62 selects the dead band width αi corresponding to the vehicle velocity V acquired by the process of S70 (S72). For example, in the case where the vehicle velocity V is a value in the region A2, the PU 62 selects the dead band width α2.

Next, the PU 62 assigns a value resulting from adding a value resulting from subtracting the last value "θh(n−1)" of the steering angle θh from the current value "θh(n)" of the steering angle θh, to the last value "Δα(n−1)" of the in-dead-band position Δα, to a provisional position X (S74). Next, the PU 62 determines whether the provisional position X is equal to or more than "(−1)·αi/2" and is equal to or less than "αi/2" (S76). This process is a process of determining whether the combination of the steering angle θh and the turning angle θt is in the dead band region. In the case where the PU 62 determines that the provisional position X is equal to or more than "(−1)·αi/2" and is equal to or less than "αi/2" (S76: YES), the PU 62 assigns the provisional position X to the dead band position Δα (S77).

On the other hand, in the case where the PU 62 makes the negative determination in the process of S76, the PU 62 determines whether the provisional position X is larger than "αi/2" (S78). In the case where the PU 62 determines that the provisional position X is larger than "αi/2" (S78: YES), the PU 62 assigns "αi/2" to the in-dead-band position Δα (S80). On the other hand, in the case where the PU 62 determines that the provisional position X is less than "αi/2" (S78: NO), the PU 62 assigns "(−1)·αi/2" to the in-dead-band position Δα (S82).

In the case where the PU 62 completes the process of S77, S80, or S82, the PU 62 ends the sequence of processes shown in FIG. 8 once.

Dead Band Compensation Torque Calculation Process M14

Figure 9:
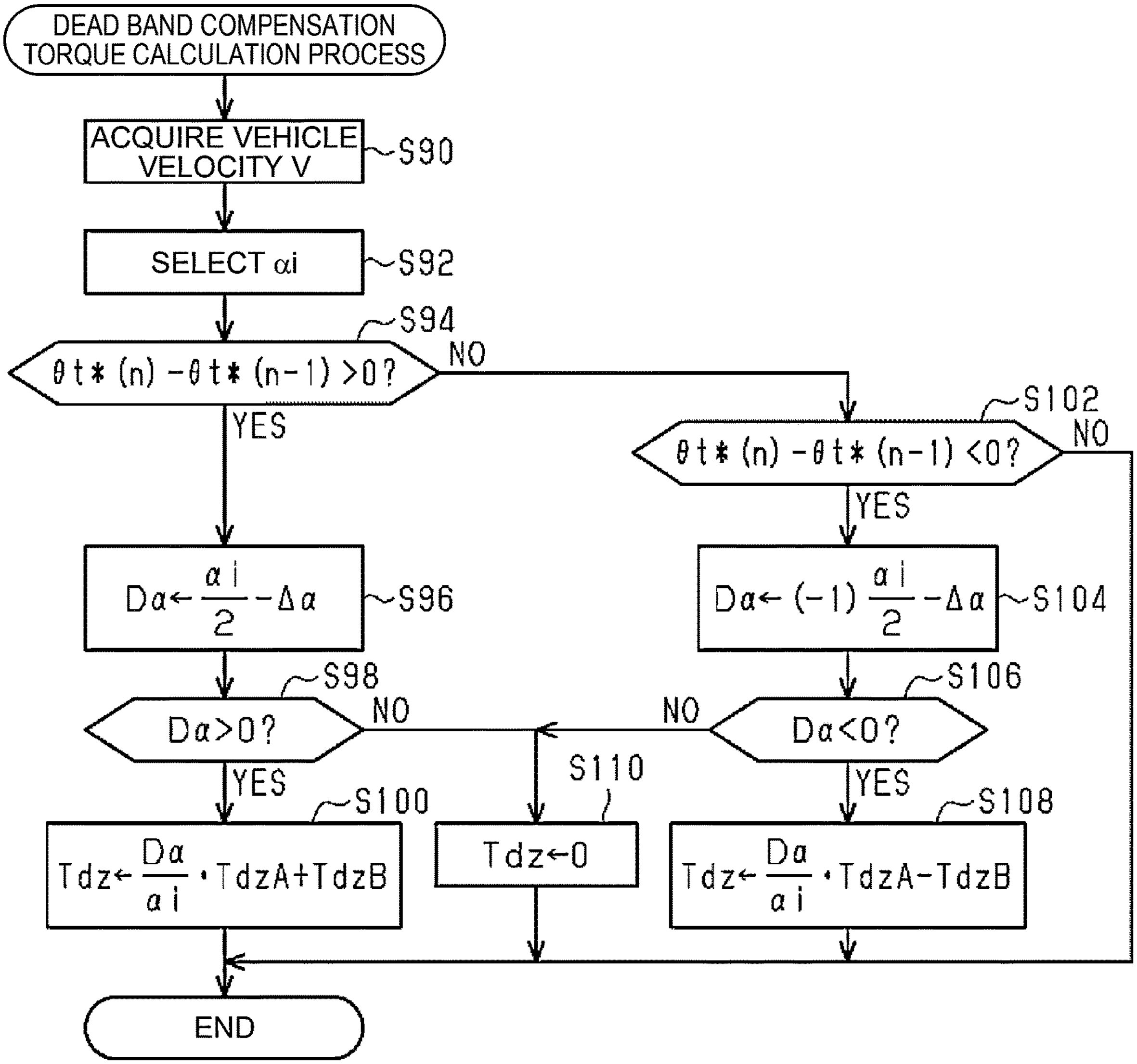
FIG. 9 is a flowchart showing a procedure of a process that is executed by the steering control device shown in FIG. 1.

FIG. 9 shows a procedure of the dead band compensation torque calculation process M14. Processes shown in FIG. 9 are realized when the PU 62 repeatedly executes programs stored in the storage device 64, for example, with a predetermined period.

In the sequence of processes shown in FIG. 9, first, the PU 62 acquires the vehicle velocity V (S90). Next, the PU 62 selects the dead band width αi corresponding to the vehicle velocity V acquired by the process of S90 (S92).

The PU 62 determines whether a value resulting from subtracting the last value "θt*(n−1)" of the target turning angle θt* from the current value "θt*(n)" of the target turning angle θt* is positive (S94). This process is a process of determining whether the steering direction is the right-turn direction. In the case where the PU 62 determines the above value resulting from the subtraction is positive (S94: YES), the PU 62 assigns a value resulting from subtracting the in-dead-band position Δα from "½" of the dead band width αi selected by the process of S92, to a dead band amount Dα (S96). The dead band amount Dα by the process of S96 is a maximal amount in which the turning angle θt does not change when the steering angle θh is changed in the right-turn direction.

Next, the PU 62 determines whether the dead band amount Dα is larger than zero (S98). In the case where the PU 62 determines that the dead band amount Dα is larger than zero (S98: YES), the PU 62 assigns the sum of a value resulting from multiplying a prescribed torque TdzA by a value resulting from dividing the dead band amount Dα by the dead band width αi and an offset amount TdzB, to a dead band compensation torque Tdz (S100).

On the other hand, in the case where the PU 62 makes the negative determination in the process of S94, the PU 62 determines whether the value resulting from subtracting the last value "θt*(n−1)" of the target turning angle θt* from the current value "θt*(n)" of the target turning angle θt* is negative (S102). This process is a process of determining whether the steering direction is the left-turn direction. In the case where the PU 62 determines that the above value resulting from the subtraction is negative (S102: YES), the PU 62 assigns a value resulting from subtracting the in-dead-band position $\Delta\alpha$ from "−½" of the dead band width $\alpha i$ selected by the process of S92, to the dead band amount $D\alpha$ (S104). The absolute value of the dead band amount $D\alpha$ by the process of S104 is a maximal amount in which the turning angle θt does not change when the steering angle θh is changed in the left-turn direction, and the maximal amount means the maximum of the absolute value. Here, the dead band amount $D\alpha$ is equal to or less than zero.

In the case where the PU 62 determines that the dead band amount $D\alpha$ is smaller than zero (S106: YES), the PU 62 assigns a value resulting from subtracting the offset amount TdzB from the value resulting from multiplying the prescribed torque TdzA by the value resulting from dividing the dead band amount $Da\alpha$ by the dead band width $\alpha i$, to the dead band compensation torque Tdz (S108).

On the other hand, in the case where the PU 62 makes the negative determination in the process of S98 or S106, the PU 62 assigns "0" to the dead band compensation torque Tdz (S110). In the case where the PU 62 completes the process of S100, S108, or S110 or in the case where the PU 62 makes the negative determination in the process of S102, the PU 62 ends the sequence of processes shown in FIG. 9 once.

Figure 10:
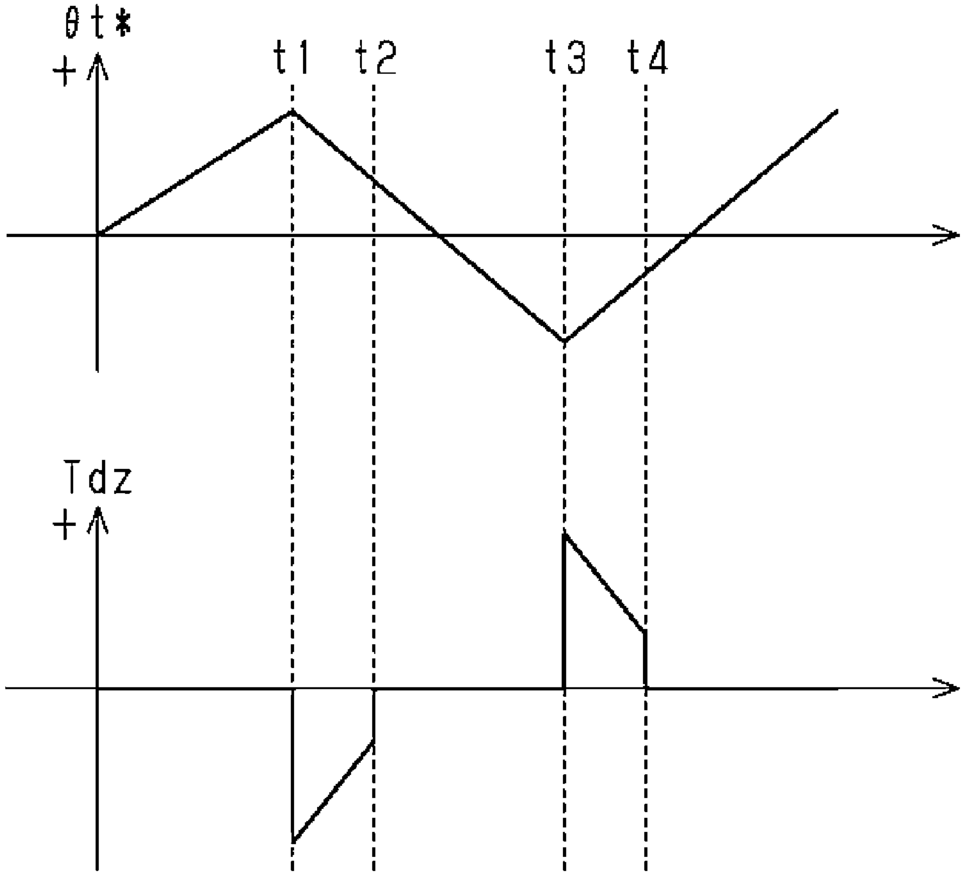
FIG. 10 is a time chart exemplifying a process that is executed by the steering control device shown in FIG. 1.

FIG. 10 shows an example of the transition of the dead band compensation torque Tdz according to the embodiment. As shown in FIG. 10, at time t1 when the PU 62 determines that the steering direction has changed from the right-turn direction to the left-turn direction based on the target turning angle θt*, the PU 62 sets the dead band compensation torque Tdz to a torque for the left turn. In FIG. 10, it is assumed that the turning angle θt is not in the dead band region immediately before time t1. Therefore, the dead band amount $D\alpha$ at time t1 is "−αi". Therefore, at time t1, the PU 62 changes the dead band compensation torque Tdz from "0" to "−TdzA−TdzB" in a stepwise manner. Then, the PU 62 gradually decreases the magnitude of the dead band compensation torque Tdz, until the dead band amount $D\alpha$ becomes zero. At time t2 when the dead band amount $D\alpha$ becomes zero, the PU 62 changes the dead band compensation torque Tdz from "−TdzB" to "O0" in a stepwise manner.

Thereafter, at time t3 when the PU 62 determines that the steering direction has changed from the left-turn direction to the right-turn direction based on the target turning angle θt*, the PU 62 sets the dead band compensation torque Tdz to a torque for the right turn. The dead band amount $D\alpha$ at time t3 is "αi". Therefore, at time t3, the PU 62 changes the dead band compensation torque Tdz from "0" to "TdzA+TdzB" in a stepwise manner. Then, the PU 62 gradually decreases the magnitude of the dead band compensation torque Tdz, until the dead band amount $D\alpha$ becomes zero. A time t4 when the dead band amount $D\alpha$ becomes zero, the PU 62 changes the dead band compensation torque Tdz from "TdzB" to "0" in a stepwise manner.

In this way, in the case where the turning angle θt is in the dead band region, the PU 62 controls the torque of the motor 50, using the dead band compensation torque Tdz as the manipulated variable for the feedforward control. Therefore, it is possible to enhance the responsiveness of the turning angle θt, compared to the case where the torque of the motor 50 is controlled using only the feedback manipulated variable Tfb.

Operation and Effect of Embodiment

The PU 62 acquires the yaw rate γ and the steering angle θh in synchronization. Then, the PU 62 stores the turning angle θt calculated from the yaw rate γ and the vehicle velocity V, in the storage device 64, in association with the corresponding steering angle θh. When a sufficient number of sampling values each of which is the combination of the steering angle θh and the turning angle θt are stored in the storage device 64, the PU 62 calculates approximation expressions shown by the sampling values. The PU 62 calculates the slopes of the approximation expressions as the stiffness coefficient ki. Further, the PU 62 assigns the difference between the respective intercepts of the approximation expression that is decided from sampling values for the right-turn direction and the approximation expression that is decided from sampling values for the left-turn direction, to the dead band width αi. Thereby, it is possible to learn the stiffness coefficient ki and the dead band width αi that are specific to the steering device 10.

In the above-described embodiment, the following operations and effects are further obtained.

(1-1) The PU 62 learns the dead band width αi depending on the vehicle velocity V. Thereby, it is possible to calculates the in-dead-band position Δα with higher accuracy, compared to the case where the dead band width αi is a value that does not depend on the vehicle velocity V.

(1-2) The PU 62 learns the stiffness coefficient ki depending on the vehicle velocity V. Thereby, it is possible to estimate the turning angle θt with higher accuracy, compared to the case where the stiffness coefficient ki is a value that does not depend on the vehicle velocity V.

(1-3) The PU 62 estimates the turning angle θt using the yaw rate γ when the magnitude of the steering angle θh is equal to or more than the learning minimum θL. In the case where the magnitude of the steering angle θh is excessively small, the yaw rate γ becomes excessively small, and therefore, the accuracy of the estimation of the turning angle with use of the yaw rate γ decreases. In response, in the embodiment, the turning angle θt is estimated using the yaw rate γ sampled when the magnitude of the steering angle θh is equal to or more than the learning minimum θL. Thereby, it is possible to enhance the learning accuracy based on the turning angle θt, compared to the case of the use of the yaw rate γ sampled when the magnitude of the steering angle θh is less than the learning minimum θL.

(1-4) The PU 62 estimates the turning angle θt using the yaw rate γ when the magnitude of the steering angle θh is equal to or less than the learning maximum θH. In the case where the magnitude of the steering angle θh is excessively large, the behavior of the vehicle easily becomes unstable, and therefore, the accuracy of the estimation of the turning angle θt with use of the yaw rate γ decreases. In response, in the embodiment, the turning angle θt is estimated using the yaw rate γ sampled when the magnitude of the steering angle θh is equal to or less than the learning maximum θH. Thereby, it is possible to enhance the learning accuracy based on the turning angle θt, compared to the case of the use of the yaw rate γ sampled when the magnitude of the steering angle θh is larger than the learning maximum θH.

(1-5) The PU 62 estimates the turning angle θt using the yaw rate γ when the magnitude of the steering angular velocity ωh is equal to or less than the threshold ωth1. In the case where the steering angle θh changes, the yaw rate γ is not stable, and therefore, the accuracy of the estimation of the turning angle θt with use of the yaw rate γ decreases. In response, in the embodiment, the turning angle θt is estimated using the yaw rate γ sampled when the magnitude of the steering angular velocity θh is equal to or less than the threshold ωth1. Thereby, it is possible to enhance the learning accuracy based on the turning angle θt, compared to the case of the use of the yaw rate γ sampled when the magnitude of the steering angular velocity ωh is larger than the threshold ωth1.

(1-6) The PU 62 estimates the turning angle θt using the yaw rate γ when the combination of the steering angle θh and the turning angle θt is not in the dead band region. In the case where the yaw rate γ is sampled when the combination of the steering angle θh and the turning angle θt is in the dead band region, the relation between the turning angle θt known from the yaw rate γ and the steering angle θh is influenced by the dead band region. Meanwhile, the dead band region is not a region that is unambiguously decided depending on the steering angle θh and the turning angle θt, and is a region that changes depending on the history of the steering angle θh. Therefore, the relation between the turning angle θt and the steering angle θh that is influenced by the dead band region is a relation specific to a situation when the sampling is performed. In response, in the embodiment, the turning angle θt is estimated using the yaw rate γ sampled when the combination of the steering angle θh and the turning angle θt is not in the dead band region. Thereby, the PU 62 can know a general relation unrelated to the history of every driving, as the relation between the steering angle θh and the turning angle θt.

(1-7) The PU 62 estimates the turning angle θt using the yaw rate γ when the magnitude of the steering angular velocity ωh during the latest predetermined period is equal to or less than the threshold ωth2. In the case where the change in the steering angle during the latest predetermined period is large, there is fear that the behavior of the vehicle at the time of the sampling is not stable. That is, there is fear that the behavior of the vehicle at the time of the sampling is influenced by the change in the steering angle during the predetermined period. In that case, the accuracy of the turning angle θt that is calculated from the sampled yaw rate γ decreases. In response, in the embodiment, the sampling is executed in the case where the magnitude of the steering angular velocity ωh during the latest predetermined period is equal to or less than the threshold ωth2, and therefore, it is possible to enhance the accuracy of the estimation of the turning angle θt.

(1-8) The PU 62 learns the dead band width αi and the stiffness coefficient ki using the turning angle θt that is estimated from the yaw rate γ sampled in each of the first state, the second state, the third state, and the fourth state. This means the following, for example, unlike the case of the use of only the turning angle θt that is estimated from the yaw rate γ sampled in each of the first state and the third state. That is, the right-turn straight line L1 and the left-turn straight line L2 are decided using sampling points about the steering angle θh and turning angle θt in a wider range. Therefore, it is possible to enhance the accuracy with which the relation between the steering angle θh and turning angle θt at the time of the right turn or left turn in the actual steering is approximated by the right-turn straight line L1 or the left-turn straight line L2.

(1-9) The PU 62 samples the yaw rate γ that is used in the learning, to the same number as each other, in the respective states of the first state, the second state, the third state, and the fourth state. Thereby, it is possible to enhance the accuracy with which the relation between the steering angle θh and turning angle θt at the time of the right turn or left turn in the actual steering is approximated by the right-turn straight line L1 or the left-turn straight line L2.

(1-10) The stiffness coefficient ki is calculated using all sampling points for calculating the right-turn straight line L1 and the left-turn straight line L2. Therefore, it is possible to maximize the number of sampling points for calculating the stiffness coefficient ki. Accordingly, it is possible to calculate the stiffness coefficient ki with higher accuracy, compared to the case of the use of only some of the sampling points.

(1-11) The PU 62 employs the stiffness coefficient ki, as the slopes of the right-turn straight line L1 and the left-turn straight line L2. Thereby, it is easy to restrain the gap between the slopes of the right-turn straight line L1 and the left-turn straight line L2, compared to the case where the slopes are separately calculated.

Correspondence Relation

The correspondence relation between matters in the above embodiment and matters described in "SUMMARY" is shown as follows. The correspondence relation will be shown below for each of the numbers of the configurations described in "SUMMARY".

In the configurations 1, 2, 5, 6, and 11, the sampling process corresponds to the processes of S20 and S24. The turning angle calculation process corresponds to the process of S22. The control constant learning process corresponds to the process in FIG. 5.

In the configuration 3, the right-turn straight line calculation process corresponds to the processes of S38 and S40. The left-turn straight line calculation process corresponds to the processes of S42 and S44. The dead band width calculation process corresponds to the process of S46.

The configuration 4 corresponds to the extraction of the data in the region Ai decided for each vehicle velocity by the process of S34.

In the configuration 7, the prescribed velocity corresponds to the threshold ωth1.

The configuration 8 corresponds to the process of S16.

The configuration 9 corresponds to the process of S18.

The configuration 10 corresponds to the sampling point exemplified in FIG. 6.

In the configuration 12, the turning process corresponds to the feedback process M10, the dead band compensation torque calculation process M14, the addition process M16, and the manipulated signal generation process M18.

The configuration 13 corresponds to the calculation of the dead band compensation torque Tdz depending on the dead band amount Dα in the processes of S96 and S104 in the dead band compensation torque calculation process M14.

Other Embodiments

The embodiment can be carried out while being modified as follows. The embodiment and the following modifications can be carried out while being combined with each other as long as there is no technical inconsistency.

Sampling Process

The sampling method in the sampling process is not limited to the method exemplified in FIG. 6. That is, the method in which the sampling when the steering direction is the right-turn direction and the sampling when the steering direction is the left-turn direction are respectively performed in the region where the steering angle θh is equal to or more than the learning minimum θL and is equal to or less than the learning maximum θH and the region where the steering angle θh is equal to or more than "−θH" and is equal to or less than "−θL" is not essential. For example, the sampling may be merely executed for each of the right-turn direction and the left-turn direction in the region where the steering angle θh is equal to or more than the learning minimum θL and is equal to or less than the learning maximum θH. Further, for example, the sampling may be merely executed for each of the right-turn direction and the left-turn direction in the region where the steering angle θh is equal to or more than "−θH" and is equal to or less than "−θL"

The execution condition for the sampling process does not need to be the condition that the positive determination is made in all of the processes of S12 to S18.

Turning Angle Calculation Process

In the process of S22, the PU 62 calculates the turning angle θt using the stability factor A and the wheelbase I, but the present disclosure is not limited to this. For example, in a state where map data is stored in the storage device 64, the PU 62 may perform the map computation of the turning angle θt. The map data is data in which the yaw rate γ and the vehicle velocity V are adopted as input variables and the turning angle θt is adopted as an output variable.

Control Constant Learning Process

In FIG. 6, the number of sampling points that are used in the control constant learning process in each state of the first state, the second state, the third state, and the fourth state is three, but the present disclosure is not limited to this. For example, the number of sampling points that are used in the control constant learning process in each state may be two. Further, for example, the number of sampling points that are used in the control constant learning process in each state may be four. Further, the numbers of sampling points that are used in the control constant learning process in the respective states do not need to be the same as each other.

The sampling points that are used in the learning of the stiffness coefficient ki are not limited to the points exemplified in FIG. 6. That is, the sampling points that are used in the control constant learning process are not limited to the points sampled in the respective states of the above first to fourth states. For example, the sampling points that are used in the learning of the stiffness coefficient ki may include only the points sampled in three arbitrary states of the four states of the above first to fourth states. Further, for example, the sampling points that are used in the learning of the stiffness coefficient ki may include only the points sampled in two arbitrary states of the four states of the above first to fourth states. Further, for example, the sampling points that are used in the learning of the stiffness coefficient ki may include only the points sampled in one arbitrary state of the four states of the above first to fourth states. On that occasion, the number of sampling points only needs to be two or more.

The sampling points that are used in the learning of the dead band width αi are not limited to the points sampled in the respective states of the above first to fourth states. For example, the sampling points that are used in the learning of the dead band width αi may include only the points sampled in the first state and the third state. On that occasion, the number of sampling points in each state only needs to be two or more. Further, for example, the sampling points that are used in the learning of the dead band width αi may include only the points sampled in the second state and the fourth state. On that occasion, the number of sampling points in each state only needs to be two or more.

The sampling points that are used in the learning of the stiffness coefficient ki and the sampling points that are used in the learning of the dead band width αi do not need to be the same. The learning process for the dead band width αi does not need to be executed after the learning process for the stiffness coefficient ki. For example, the right-turn straight line L1 and the left-turn straight line L2 may be calculated before the learning of the stiffness coefficient ki. Even in that case, the dead band width αi can be learned by the process of S46. In that case, for example, the stiffness coefficient ki may be the average of the slope of the right-turn straight line L1 and the slope of the left-turn straight line L2.

The control constant learning process does not need to be a process of learning the dead band width αi at each of different vehicle velocities V from each other. For example, a process of learning the dead band width αi at a single vehicle velocity V that is higher than zero may be adopted.

The control constant learning process does not need to be a process of learning the stiffness coefficient ki at each of different vehicle velocities V from each other. For example, a process of learning the stiffness coefficient ki at a single vehicle velocity V may be adopted.

Turning Process

The process of manipulating the torque of the motor 50 using the dead band amount Dα that is calculated depending on the dead band width αi, as an input is not limited to the process of using the dead band compensation torque Tdz. For example, a process of correcting the target turning angle θt* depending on the dead band amount Dα may be adopted.

Torque Control of Motor

A drive circuit of the motor 50 does not need to be operated depending on the manipulated variable for the control in which the turning angle is the controlled variable and the target value of the turning angle is the target value of the controlled variable. For example, the drive circuit of the motor 50 may be operated depending on a manipulated variable for a feedforward control that depends on a target value. In that case, in the dead band, the PU 62 may superpose the dead band compensation torque Tdz on a manipulated variable for a feedforward control that is calculated even outside of the dead band region.

Autonomous Driving Mode

In the autonomous driving mode, the sensing member that is used for acquiring the information about the exterior of the vehicle that include lanes is not limited to the camera 82. For example, a LIDAR may be used.

Traveling Mode

The traveling mode in which the dead band compensation torque Tdz is superposed on the torque of the motor 50 is not limited to the autonomous driving mode. For example, a manual driving mode that is a mode in which the steering by the driver is executed may be adopted. In that case, for example, in the processes of S94 and S102, the steering angle θh only needs to be employed instead of the target turning angle θt*

Steering Control Device

The high-order ECU 80 and the steering control device 60 may be integrally configured. The steering control device is not limited to a device that executes software processing. For example, a dedicated hardware circuit that executes at least some of the processes that are executed in the above embodiment, as exemplified by an ASIC, may be included. That is, the steering control circuit only needs to include a processing circuit that has one configuration of the following (a) to (c).

(a) A processing circuit including a processing device that executes all of the above processes in accordance with programs and a program storing device that stores programs, as exemplified by a storage device.

(b) A processing circuit including a processing device that executes some of the above processes in accordance with programs, a program storing device, and a dedicated hardware circuit that executes the other processes.

(c) A processing circuit including a dedicated hardware circuit that executes all of the above processes.

A plurality of software execution devices each of which includes a processing device and a program storing device may be provided. Further, a plurality of dedicated hardware circuits may be provided.

What is claimed is:

1. A steering control device comprising a software processing device, wherein:

the software processing device controls a steering device;

the steering device includes a steering shaft, and a turning wheel of a vehicle, the turning wheel turning with rotation of the steering shaft;

the software processing device is configured to execute a sampling process, a turning angle calculation process, and a control constant learning process;

wherein the sampling process is a process of sampling a steering angle and a yaw rate in synchronization;

the steering angle is a rotation angle of the steering shaft;

the turning angle calculation process is a process of calculating a turning angle of the turning wheel, using the yaw rate and a vehicle velocity as inputs;

the control constant learning process is a process of learning a control constant based on a plurality of combinations each of which is constituted by the steering angle sampled by the sampling process and the turning angle corresponding to the steering angle;

the control constant is a constant that indicates a rotational displacement of the turning wheel with respect to a rotational displacement of the steering shaft, the control constant includes a dead band width;

the dead band width is a rotation amount by which the steering shaft rotates after a rotation direction of the steering shaft switches from one of a right-turn direction and a left-turn direction to the other of the right-turn direction and the left-turn direction and before the turning wheel turns;

the control constant learning process includes a right-turn straight line calculation process, a left-turn straight line calculation process, and a dead band width calculation process;

the right-turn straight line calculation process is a process of calculating a right-turn straight line from a first plurality of combinations included in the plurality of combinations each of which is constituted by the sampled steering angle and the turning angle corresponding to the steering angle and being combinations when the rotation direction is the right-turn direction;

the left-turn straight line calculation process is a process of calculating a left-turn straight line from a second plurality of combinations included in the plurality of combinations each of which is constituted by the sampled steering angle and the turning angle corresponding to the steering angle and being combinations when the rotation direction is the left-turn direction; and the dead band width calculation process is a process of calculating a difference in intercept between the right-turn straight line and the left-turn straight line, as the dead band width.

2. The steering control device according to claim 1, wherein:

the control constant includes a stiffness coefficient that is a ratio of the turning angle to the steering angle; and the control constant learning process is a process of learning a slope of a straight line as the stiffness coefficient, the slope of the straight line being decided from the plurality of combinations each of which is constituted by the steering angle and the turning angle corresponding to the steering angle.

3. The steering control device according to claim 1, wherein the control constant learning process is a process of calculating the control constant for each of different vehicle velocities from each other, based on a plurality of combinations each of which is constituted by the steering angle sampled by the sampling process for each of the different vehicle velocities from each other and the turning angle corresponding to the steering angle.

4. The steering control device according to claim 1, wherein the sampling process is executed when a magnitude of the steering angle is equal to or more than a learning minimum.

5. The steering control device according to claim 1, wherein the sampling process is executed when a magnitude of the steering angle is equal to or less than a learning maximum.

6. The steering control device according to claim 1, wherein the sampling process is executed when a magnitude of a change velocity of the steering angle is equal to or less than a prescribed velocity.

7. The steering control device according to claim 1, wherein:

the sampling process is executed when the combination of the steering angle and the turning angle is not in a dead band region; and the dead band region is a region where the turning angle does not change in response to change in the steering angle.

8. The steering control device according to claim 1, wherein the sampling process is executed when a magnitude of a change velocity of the steering angle during a latest predetermined period is equal to or less than a threshold.

9. The steering control device according to claim 1, wherein:

the sampling process is executed in each of a first state, a second state, a third state, and a fourth state;

the first state is a state where the steering angle when the steering angle changes in a right-turn direction is in a right-turn region;

the second state is a state where the steering angle when the steering angle changes in the right-turn direction is in a left-turn region;

the third state is a state where the steering angle when the steering angle changes in a left-turn direction is in the right-turn region; and the fourth state is a state where the steering angle when the steering angle changes in the left-turn direction is in the left-turn region.

10. The steering control device according to claim 2, wherein:

the software processing device is configured to execute a turning angle estimation process; and the turning angle estimation process is a process of calculating an estimated value of the turning angle, using a detected value of the steering angle and the stiffness coefficient learned by the control constant learning process.

11. The steering control device according to claim 10, wherein:

the steering device includes a motor that rotates the steering shaft;

the software processing device is configured to execute a turning process; and the turning process is a process of manipulating a torque of the motor depending on a manipulated variable for a feedback control in which the estimated value of the turning angle is a controlled variable and a target value of the turning angle is a target value of the controlled variable.

12. The steering control device according to claim 1, wherein:

the steering device includes a motor that rotates the steering shaft;

the software processing device is configured to execute a turning process;

the turning process is a process of manipulating a torque of the motor using a dead band amount as an input, the dead band amount being calculated depending on the dead band width learned by the control constant learning process; and the dead band amount is a maximal amount in which the turning angle does not change in response to change in the steering angle in a steering direction.

* * * * *